(12) United States Patent
Kertes

(10) Patent No.: US 7,311,164 B1
(45) Date of Patent: Dec. 25, 2007

(54) ILLUMINATED SCOOTER

(76) Inventor: Jon P. Kertes, 10970 Amery Ave., South Gate, CA (US) 90280

( * ) Notice: Subject to any disclaimer, the term of this patent is extended or adjusted under 35 U.S.C. 154(b) by 0 days.

(21) Appl. No.: 11/245,787

(22) Filed: Oct. 7, 2005

(51) Int. Cl.
*B62M 1/20* (2006.01)

(52) U.S. Cl. ............... 180/180; 280/79.11; 280/47.34; 280/87.041; 280/87.05; 280/655; 180/68.5; 180/219; 180/65.1

(58) Field of Classification Search ............... 180/181, 180/68.5, 219, 65.1; 280/11.203, 87.041, 280/87.05, 79.11, 47.34, 655
See application file for complete search history.

(56) References Cited

U.S. PATENT DOCUMENTS

| | | | | |
|---|---|---|---|---|
| 2,505,154 | A * | 4/1950 | Smith | ............... 315/78 |
| 3,171,058 | A * | 2/1965 | Ono | ............... 315/78 |
| 5,119,277 | A | 6/1992 | Copley | |
| 5,132,883 | A | 7/1992 | La Lumandier | |
| 5,513,080 | A | 4/1996 | Magle | |
| 5,631,507 | A * | 5/1997 | Bajric et al. | ............... 310/67 A |
| 6,337,528 | B1 | 1/2002 | Jung | |
| 6,386,562 | B1 * | 5/2002 | Kuo | ............... 280/87.042 |
| 6,533,438 | B2 | 3/2003 | Ter-Hovhannisian | |
| 6,609,584 | B2 * | 8/2003 | Patmont et al. | ............... 180/220 |
| 6,621,419 | B2 * | 9/2003 | Chiu | ............... 340/815.42 |
| 6,688,636 | B2 * | 2/2004 | Han | ............... 280/655 |
| 6,703,716 | B2 * | 3/2004 | Chiu | ............... 290/1 R |
| 6,752,229 | B2 * | 6/2004 | Ho | ............... 180/181 |
| 6,802,636 | B1 * | 10/2004 | Bailey, Jr. | ............... 362/555 |
| 6,832,660 | B2 * | 12/2004 | Dodd | ............... 180/220 |
| 7,040,443 | B1 * | 5/2006 | Roth et al. | ............... 180/221 |
| 7,048,284 | B1 * | 5/2006 | Seifert | ............... 280/79.11 |
| 7,145,256 | B2 * | 12/2006 | Koharcheck et al. | ............... 290/1 R |

\* cited by examiner

*Primary Examiner*—Christopher P. Ellis
*Assistant Examiner*—Cynthia F. Collado
(74) *Attorney, Agent, or Firm*—Kenneth L. Tolar

(57) ABSTRACT

An illuminated scooter includes a platform having a pivotal, length-adjustable handlebar at a front end and a wheel at a back end. Mounted on the upper surface of the platform adjacent the wheel is a generator including a drive shaft with a roller at a distal end thereof. The generator is biased rearwardly whereby a rider can selectively move the roller into engagement with the scooter rear wheel. When the roller is moved into engagement with the rear wheel, the generator powers a plurality of LED's that are fastened to each of two side edges of the platform. An associated microprocessor selectively activates certain segments of the LED's according to the scooter speed.

6 Claims, 1 Drawing Sheet

U.S. Patent                Dec. 25, 2007                US 7,311,164 B1

ILLUMINATED SCOOTER

BACKGROUND OF THE INVENTION

The present invention relates to a scooter having a light system that is selectively activated whenever the scooter is moving.

DESCRIPTION OF THE PRIOR ART

A scooter is a very popular child's toy. However, the danger associated with riding a scooter at night increases dramatically. Accordingly, there is currently a need for a scooter that is more visible in darkness.

A review of the prior art indicates several illuminated scooters and skateboards. For example, U.S. Pat. No. 6,533,438 issued to Ter-Hovhannisian discloses an illuminated scooter or bicycle including LED's that are activated with a motion detector or photo sensor.

U.S. Pat. No. 5,119,277 issued to Copley, et al., discloses an illuminated skateboard including lights that are activated with a sliding switch.

U.S. Pat. No. 5,132,883 issued to La Lumandier discloses an illuminated railing for a skateboard including a control unit for pulsing the lights either synchronously or asynchronously.

U.S. Pat. No. 5,513,080 issued to Magic, et al., discloses an indirect lighting system for the underside of roller skates and skateboards.

U.S. Pat. No. 6,337,528 issued to Jung discloses a roller for securing to a scooter roller shaft including a housing with a light permeable rim having a light source therein; the light source is activated by an internal generator as the scooter is propelled.

E.P.O. Patent number 0556370 issued to Pozzobon, et al., discloses a power generator for a roller skate for powering various electrical devices such as fans, a light source or a heater.

Although the prior art discloses scooters having generators for powering light systems, none of the above referenced patents disclose a means for selectively disengaging the generator, if necessary or desired. Furthermore, each of the above referenced devices includes lights that are simply activated or deactivated, with the exception of La Lumandier, which discloses a control circuit for pulsing lights on a skateboard. However, the light pulsing is in no way related to the speed of the skateboard.

The present invention overcomes the above enumerated disadvantages of the prior art by providing a uniquely designed scooter having a light system thereon that is activated with a generator. The generator is driven by the scooter wheel and can be moved into engagement therewith by a rider's foot. Furthermore, the device includes a speed detection circuit that sequentially activates discrete segments of the lights according to the speed of the scooter.

SUMMARY OF THE INVENTION

The present invention comprises an illuminated scooter including a platform having a pivotal, length-adjustable handlebar at a front end and a wheel at a back end. Mounted on the upper surface of the platform, immediately behind the wheel, is a generator including a drive shaft with a roller at a distal end thereof. The generator is biased rearwardly whereby a rider can selectively move the roller into engagement with the scooter rear wheel. When the roller is moved into engagement with the rear wheel, the generator powers a plurality of LED's that are fastened to each of two side edges of the platform. The device also includes a microprocessor that selectively activates certain segments of the LED's according to the scooter speed.

It is therefore an object of the present invention to provide a scooter having a uniquely illuminable lighting system thereon.

It is another object of the present invention to provide a scooter having a light system segregated into segments that are sequentially activated in a discrete order according to the scooter's speed.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 4:
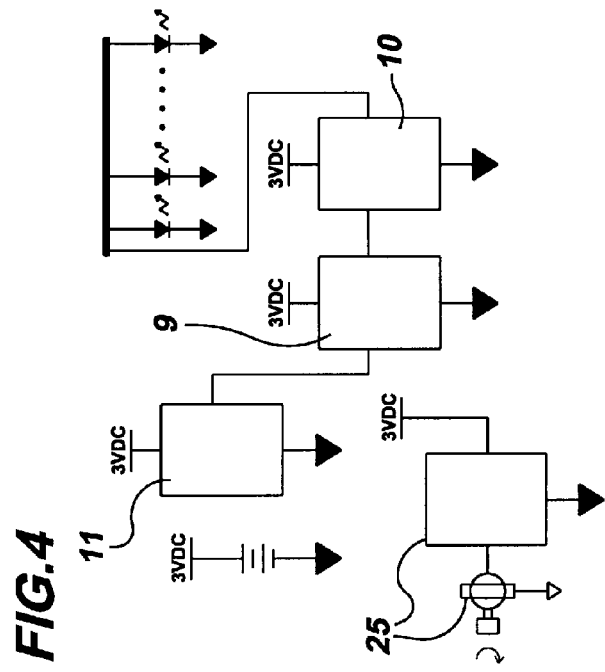
FIG. 4 is a schematic of the various electronic components according to the present invention.
Figure 3:
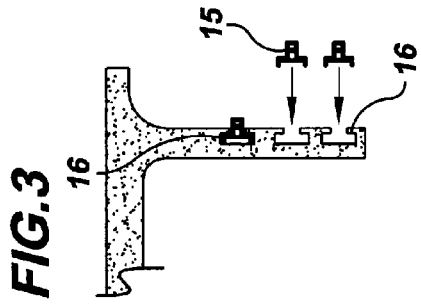
FIG. 3 is a sectional view of the platform depicting the method of mounting LED's thereon.
Figure 2:
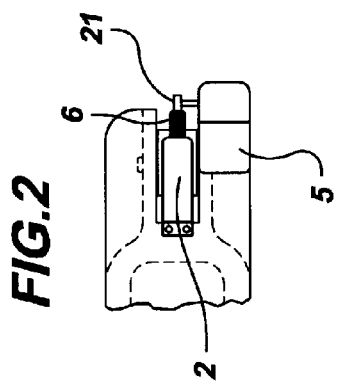
FIG. 2 is a top, sectional view of the generator.
Figure 1:
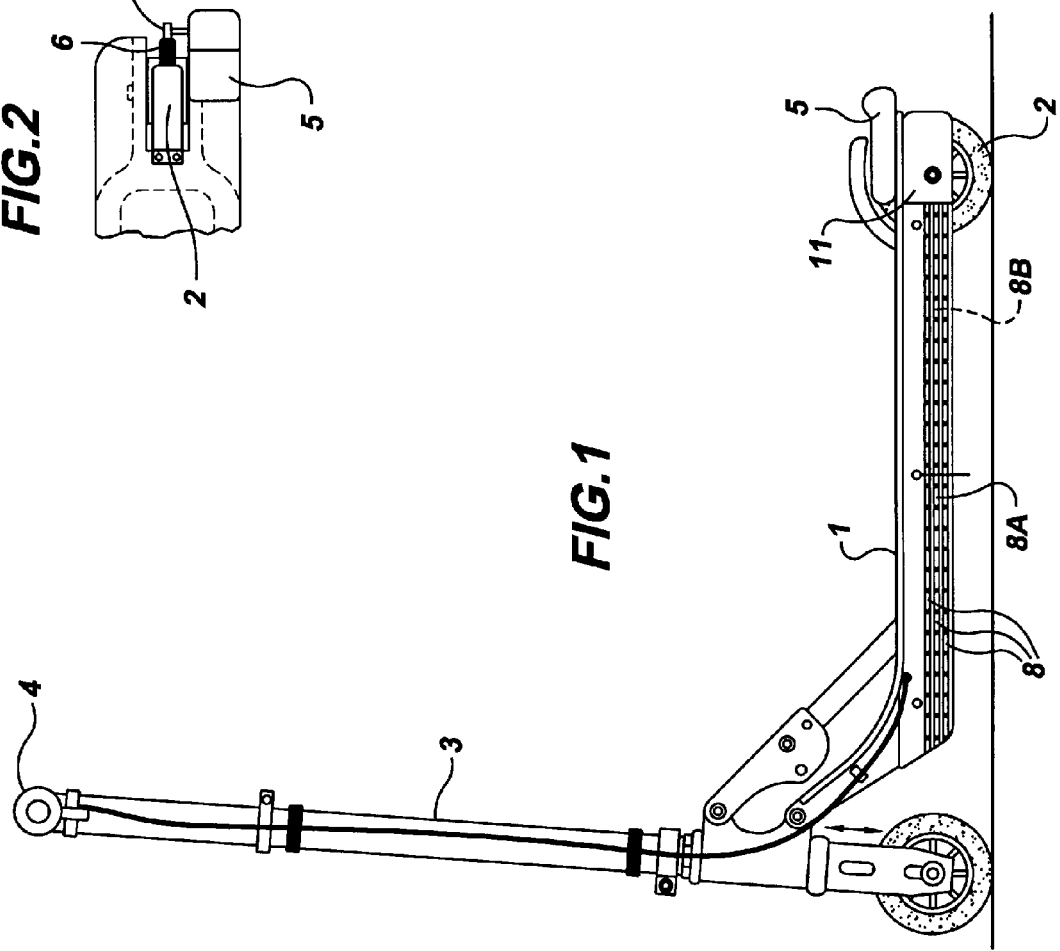
FIG. 1 is a side view of the scooter according to the present invention.

The present invention relates to a lighted scooter. The device comprises a substantially planar riding platform 1 having an upper surface, a lower surface, a front end and a back end with a rear wheel 2 proximal the back end. Pivotally and collapsibly secured to the front end of the platform is a telescopic, length-adjustable handlebar 3 having a front wheel secured to a lower end thereof. A T-shaped handle 4 is secured to the upper end of the handlebar.

Slidably mounted on the upper surface of the platform, behind the rear wheel, is a housing 5 with a generator 25 received therein. A generator drive shaft 21 extends from a side of the housing that includes a roller 6 at a distal end. The housing is spring-biased rearwardly so that the roller is normally disengaged from the scooter rear wheel. However, by placing a foot on the upper surface of the housing, a rider can easily move the drive shaft roller into engagement with the scooter rear wheel; accordingly, when the roller is so engaged, movement of the scooter rear wheel rotates the drive shaft thereby activating the internal generator.

Electrically connected to the generator are a plurality of LED strands 8 that are secured to each of two opposing side edges of the platform. Each strand of LED's is segregated into two separate segments, 8A, 8B, each of which is individually illuminable. Each LED 15 on a strand fits within a designated C-shaped recess 16 on the platform side edge.

Illumination of the various LED strand segments is controlled by a microprocessor 9, an LED driver 10 and a speed detector 11. The speed detector includes a wheel RPM sensor mounted on the platform that determines the number of scooter wheel spokes passing a reference point within a given time interval to calculate the relative speed of the scooter. The microprocessor is preprogrammed to activate a select one or more light strand segments according to the scooter speed. Accordingly, as the scooter speed increases, additional light segments will be sequentially illuminated to create an aesthetically unique and entertaining special effect.

For example, when the scooter is traveling at a predetermined minimum speed, only a first segment of an uppermost strand is illuminated. As the speed increases, the other segment of the uppermost strand is illuminated while each of the remaining segments will be sequentially illuminated as the speed increases. The microprocessor can be programmed to continuously activate or pulse the LED's, or to pulse or continuously illuminate any or all of the light strand segments whenever the spring-biased generator housing is released.

The above described invention is not limited to the exact details of construction in the enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A lighted scooter comprising:
   a riding platform having an upper surface, a lower surface, a front end and a back end;
   a rear wheel mounted proximal the back end of said platform;
   a telescopic, length-adjustable handlebar pivotally and collapsibly secured to the front end of the platform, said handlebar having a front wheel secured to a lower end thereof;
   a spring-biased generator assembly slidably mounted on said platform, proximal the rear wheel, said generator assembly including a drive means that is movable into selective engagement with said rear wheel for producing electricity whenever said scooter is in motion;
   a plurality of lights mounted on said scooter platform and electrically connected to said generator assembly whereby said lights are activated by said generator when said scooter is in motion.

2. The lighted scooter according to claim 1 further comprising a control means for selectively activating a discrete number of lights according to a rotational speed of said rear wheel.

3. The lighted scooter according to claim 1 wherein said drive means includes a generator drive shaft operably connected to said generator assembly, said drive shaft having a roller at a distal end.

4. The lighted scooter according to claim 2 wherein said lights are positioned on a plurality of strands mounted on each of two side edges of said platform, each of said strands segregated into two separate segments, the lights on each segment being selectively illuminable relative to lights on any other segment.

5. The lighted scooter according to claim 4 wherein said control means includes a wheel rpm detector associated with said rear wheel.

6. The lighted scooter according to claim 5 wherein said control means further includes a microprocessor means electrically connected to said light segments and said rpm detector for selectively activating a discrete light segment according to a measured rotational speed of said rear wheel.

* * * * *